(12) United States Patent
Walker

(10) Patent No.: US 9,932,010 B2
(45) Date of Patent: Apr. 3, 2018

(54) ELECTRONIC AIRBAG IGNITION CIRCUIT HAVING A VARIABLE IGNITION CURRENT DURATION

(71) Applicant: Robert Bosch GmbH, Stuttgart (DE)

(72) Inventor: Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 217 days.

(21) Appl. No.: 14/896,601

(22) PCT Filed: Apr. 3, 2014

(86) PCT No.: PCT/EP2014/056643
§ 371 (c)(1),
(2) Date: Dec. 7, 2015

(87) PCT Pub. No.: WO2014/195044
PCT Pub. Date: Dec. 11, 2014

(65) Prior Publication Data
US 2016/0121833 A1 May 5, 2016

(30) Foreign Application Priority Data

Jun. 7, 2013 (DE) .......................... 10 2013 210 603

(51) Int. Cl.
*H02H 3/08* (2006.01)
*H02H 3/087* (2006.01)
(Continued)

(52) U.S. Cl.
CPC .. *B60R 21/017* (2013.01); *B60R 2021/01286* (2013.01)

(58) Field of Classification Search
CPC ................................. H02H 3/087; H02H 3/08
(Continued)

(56) References Cited

FOREIGN PATENT DOCUMENTS

CN 101312856 A 11/2008
DE 10 2005 003245 8/2006
(Continued)

OTHER PUBLICATIONS

DE 10 2005-3245, Entire specification and drawings.*
DE 10 2007 050564, Entire specification and drawings.*

*Primary Examiner* — Dharti Patel
(74) *Attorney, Agent, or Firm* — Norton Rose Fulbright US LLP; Gerard Messina

(57) ABSTRACT

An electronic airbag ignition circuit includes a first and second output for the electrically conductive connection to a first and second terminal of a magnetic actuator. The electronic airbag ignition circuit also includes a first switching element, whose contact-break path is connected in an electrically conductive manner to the first output, and a second switching element, whose contact-break path is connected in an electrically conductive manner to the second output. The electronic airbag ignition circuit includes a second control circuit connected in an electrically conductive manner to a control terminal of the second switching element. The second control circuit is configured to close the second switching element in a first triggering mode for a first predetermined duration and in a second triggering mode for a second predetermined duration that differs from the first duration.

10 Claims, 2 Drawing Sheets

(51) Int. Cl.
*B60R 21/017* (2006.01)
*B60R 21/01* (2006.01)

(58) Field of Classification Search
USPC ........................................................ 361/93.1
See application file for complete search history.

(56) References Cited

FOREIGN PATENT DOCUMENTS

| | | |
|---|---|---|
| DE | 10 2007 002339 | 7/2008 |
| DE | 10 2007 050564 | 4/2009 |
| EP | 1 602 532 | 12/2005 |
| JP | H04278862 A | 10/1992 |
| JP | H06316249 A | 11/1994 |
| WO | WO 00/30902 | 6/2000 |

\* cited by examiner

ELECTRONIC AIRBAG IGNITION CIRCUIT HAVING A VARIABLE IGNITION CURRENT DURATION

FIELD OF THE INVENTION

The present invention relates to an electronic airbag ignition circuit, which includes a first and a second switching element as well as a second control circuit connected in an electrically conductive manner to a control terminal of the second switching element, which is configured to close the second switching element in a first triggering mode for a first predetermined duration and in a second triggering mode for a second predetermined duration that differs from the first duration.

BACKGROUND INFORMATION

Airbag ignition circuits, in particular for motor vehicles, are typically connected to a pyrotechnic firing pellet, which actuates a gas generator when current is supplied and thereby triggers an airbag. Electrically, such firing pellets correspond to an ohmic resistance. Beginning at the time of the airbag ignition, the firing pellet is supplied with a predetermined triggering current for a predetermined duration in order to trigger the airbag. Recently, however, it has become possible to connect electronic ignition circuits to an inductance or to magnetic actuators. Particularly popular is the connection of so-called LEA (low-energy actuator) magnetic actuators, that is, magnetic actuators that have a very low energy consumption. Such LEA magnetic actuators are usually used in active headrests or in electrical or electronic circuits used for activating roll bars. In airbag ignition circuits connected to such LEA magnetic actuators, there is no explosion of an firing pellet, but rather a magnetic field built up by an ignition current moves an actuator.

Most electronic airbag ignition circuits of the related art, which are used for supplying current to a magnetic actuator, have an output stage that includes a so-called high side and a so-called low side. Both the high side as well as the low side of such output stages is each essentially made up of a switching element, via which an inductance of a magnet actuator connected to the output stage of the airbag ignition circuit for the purpose of supplying current is connectable to the supply voltage terminals of an energy store. The switching element essentially forming the low side of the output stage is operated as a switch in order to discharge the ignition current, which flows through the inductance of the magnetic actuator when the airbag is triggered, to a supply voltage terminal, usually to ground.

If error conditions exist, if for example the airbag ignition circuit is short-circuited or if a short circuit occurs within the airbag ignition circuit, then in the related art the current flowing through an inductance connected to the airbag ignition circuit is limited by a circuit to a current value that lies below the ignition current required for igniting the airbag. Nevertheless, such short-circuit cases represent a substantial load for the low side, which may result in a destruction of the entire airbag ignition circuit and/or even in a failure to trigger the airbag in the event of accidents.

SUMMARY OF THE INVENTION

According to the present invention, an electronic airbag ignition circuit is provided, which includes a first and a second input for the electrically conductive connection to the poles of an energy store. Furthermore, the airbag ignition circuit includes a first and a second output for the electrically conductive connection to a first and a second terminal of a magnetic actuator. The electronic airbag ignition circuit furthermore includes a first switching element, whose contact-break path is connected in an electrically conductive manner to the first input and the first output, as well as a second switching element, whose contact-break path is connected in an electrically conductive manner to the second input and the second output. The electronic airbag ignition circuit furthermore has a second control circuit connected in an electrically conductive manner to a control terminal of the second switching element.

According to the present invention, the second control circuit is configured to close the second switching element in a first triggering mode for a first predetermined duration and in a second triggering mode for a second predetermined duration that differs from the first duration.

The advantage of such an electronic airbag ignition circuit lies in the fact that the second switching element forming the low side for the electronic airbag ignition circuit is less loaded by possibly occurring short circuits within the electronic airbag ignition circuit. The present invention makes it possible to realize or implement the electronic airbag ignition circuit of the present invention within already known or conventionally obtainable integrated solutions or application-specific integrated circuits, which were already used for supplying current to airbag firing pellets. The electronic airbag ignition circuit according to the present invention thus offers a very cost-effective option for supplying current to magnetic actuators.

The first switching element may form a part of the high side of the airbag ignition circuit and the second switching element a part of the low side of the airbag ignition circuit.

The second switching element may be operated in the first triggering mode if the flow of current through the contact-break path of the second switching element at the time of the airbag ignition corresponds to a short-circuit current flowing through the electronic airbag ignition circuit in the short-circuit case. Furthermore, the airbag ignition circuit may have an arrangement for measuring the flow of current through the airbag ignition circuit. Such a specific embodiment makes it possible to limit the duration in which a short-circuit current flows through the contact-break path of the second switching element, that is, through the low side. The low side is thus not overloaded in the short-circuit case.

The second switching element may be operated in the second triggering mode if the current flowing through the contact-break path of the second switching element at the time of the airbag ignition is not equal to a short-circuit current flowing through the electronic airbag ignition circuit in the short-circuit case. Furthermore, the second switching element may be operated in the second triggering mode if the current flowing through the contact-break path of the second switching element at the time of the airbag ignition is less than a short-circuit current flowing through the electronic airbag ignition circuit in the short-circuit case. If no short-circuit current flows through the airbag ignition circuit, then the second switching element, that is, the low side, in order to trigger an airbag, must be electrically conductive for a longer period than when an airbag firing pellet is supplied with current. This takes into account the fact that an inductance counteracts the build-up of a current flowing through it.

In one specific embodiment, the first predetermined duration is shorter than the second predetermined duration. The respectively different loads on the airbag ignition circuit in different operating states are taken into account by the varying durations in the different triggering modes.

The total output realized during the second triggering mode on the first switching element following the expiration of the second duration may correspond to the maximum admissible output to be realized on the first switching element. Furthermore, the second predetermined duration may correspond to the sum of the duration, which the final triggering of the airbag requires following the complete build-up of the current, and the duration required for the build-up of the ignition current.

The electronic airbag ignition circuit may include furthermore a first control circuit connected in an electrically conductive manner to a control terminal of the first switching element, which has an ignition current detection unit and/or a unit for controlling an ignition current. This makes it possible, among other things, to perform a plausibility check of the airbag triggering.

Furthermore, the magnetic actuator may be configured as a LEA magnetic actuator. In other words, the magnetic actuator may be configured as a low-energy actuator. Expressed again in other words, the magnetic actuator may be configured as a magnetic actuator having a low or minimal energy consumption. Compared to other actuators, such actuator consume particularly little or a minimum of energy. Furthermore, in contrast to firing pellets, they are reusable following the triggering or firing of the airbag.

The electronic airbag ignition circuit may be configured as an integrated circuit. Integrated circuits may be configured in a very compact manner and may be purchased cost-effectively for many applications as finished components.

Furthermore, the integrated circuit may be realized as an ASIC. In other words, the integrated circuit or the electronic airbag ignition circuit may be configured as an application-specific integrated circuit.

In one specific embodiment, the pole of the energy store that is connected to the second input has a ground potential.

Furthermore, a motor vehicle having an electronic airbag ignition circuit according to the present invention is provided, the battery being connected to a drive system of the motor vehicle.

Advantageous further developments of the present invention are indicated in the further descriptions herein and described in the specification.

Exemplary embodiments of the present invention are explained in greater detail with reference to the drawings and the following description.

DETAILED DESCRIPTION

Figure 1:
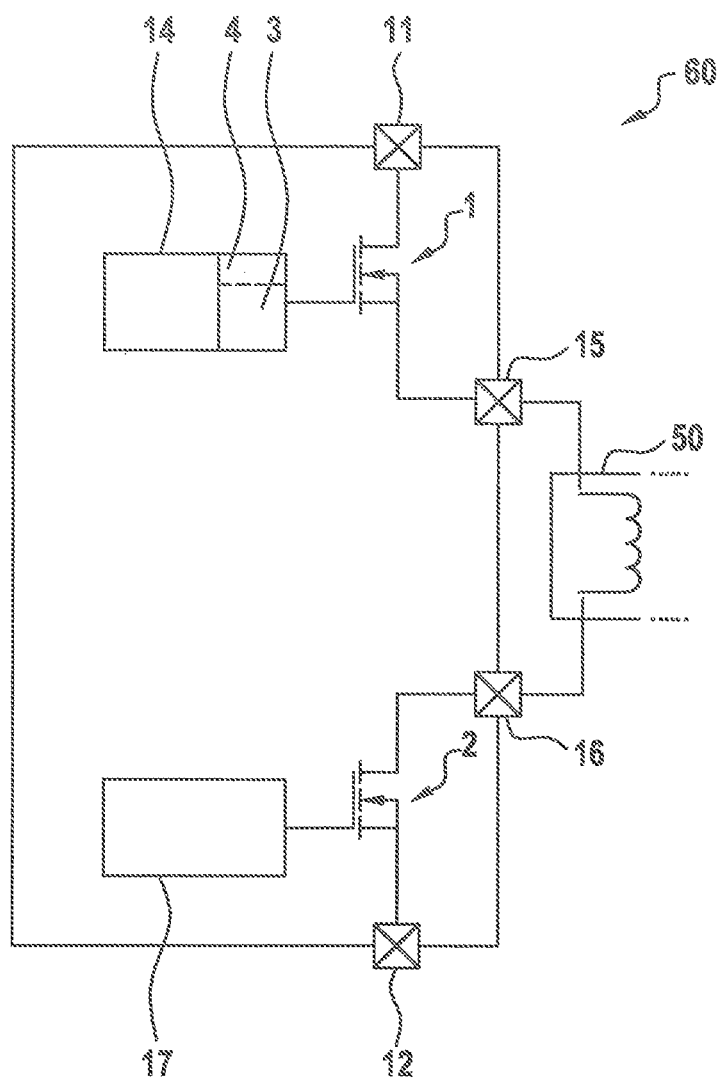
FIG. 1 an exemplary embodiment of an electronic airbag ignition circuit according to the present invention.

FIG. 1 shows an exemplary embodiment of an electronic airbag ignition circuit 60 according to the present invention. In this exemplary embodiment, electronic airbag ignition circuit 60 is configured in purely exemplary fashion as an integrated circuit, or more precisely as an ASIC, that is, as an application-specific integrated circuit. Electronic airbag ignition circuits in accordance with the present invention may also be implemented differently, however, for example as non-integrated circuits, which may also be composed of discrete electronic components, for example. Electronic airbag ignition circuit 60 includes a first and a second input 11, 12 for the electrically conductive connection to the poles of an energy store as well as a first and a second output 15, 16 for the electrically conductive connection to a first and a second terminal of a magnetic actuator 50. In this exemplary embodiment, both the first and the second input 11, 12 as well the first and second output 15, 16 are embodied purely by way of example as pins of the ASIC, that is, the application-specific integrated circuit. Electronic airbag ignition circuit 60 furthermore includes a first switching element 1, whose contact-break path is connected in an electrically conductive manner to the first input 11 and the first output 15, as well as a second switching element 2, whose contact-break path is connected in an electrically conductive manner to the second input 12 and the second output 16. In this exemplary embodiment, both the first as well as the second switching element 1, 2 are configured purely by way of example as MOSFETs. Other types of switching elements may also be used, however, to realize electronic airbag ignition circuits 60 in accordance with the present invention. First switching element 1 may also be called a high-side switching element, forming an essential part of the high side of electronic airbag ignition circuit 60. Second switching element 2 may also be referred to as a low-side switching element, that is, it forms an essential part of the low side of electronic airbag ignition circuit 60.

Electronic airbag ignition circuit 60 furthermore includes a second control circuit 17 connected in an electrically conductive manner to a control terminal of second switching element 2 as well as an optional first control circuit 14 connected in an electrically conductive manner to a control terminal of first switching element 1. The optional first control circuit 14 furthermore includes in this exemplary embodiment, purely by way of example, an optional ignition current detection unit 4 as well as an optional unit for controlling an ignition current 3. The optional ignition current detection unit 4 makes it possible to detect the flow of an ignition current within the electronic airbag ignition circuit 60 of the present invention. For this purpose, optional ignition current detection unit 4 detects the flow of an ignition current as soon as the magnitude of the ignition current exceeds a predetermined threshold. Ignition current detection unit 4 makes it possible to perform a plausibility check of the airbag triggering, which occurs independently of the units that are used to trigger the airbag. The optional unit for controlling an ignition current 3 makes it possible to control the supply of current to a magnetic actuator 50 connected to electronic airbag ignition circuit 60 or to control the supply of current to an inductance of a magnetic actuator 50 connected to electronic airbag ignition circuit 60. If an airbag ignition is to be initiated, then the unit for controlling an ignition current 3 activates first switching element 1 and second control circuit 17 activates second switching element 2, thus closing both the first switching element 1 and the second switching element 2, and thus allows for an ignition current to flow through an inductance of a magnetic actuator 50 connected to electronic airbag ignition circuits 60, thereby allowing for the airbag to be triggered.

In the exemplary embodiment of an electronic airbag ignition circuit 60 shown in FIG. 1, electronic airbag ignition circuit 60 is connected in an electrically conductive manner to an inductance of a magnetic actuator 50 via its first and its second output 15, 16. Regarding magnetic actuator 50 itself, FIG. 1 merely indicates the inductance as well as a part of the housing of magnetic actuator 50. Neither the inductance nor magnetic actuator 50 is part of the electronic airbag ignition circuit 60 according to the present invention. Thus, it is also possible to implement electronic airbag ignition circuits 60 according to the present invention that are not connected to a magnetic actuator 50 or its inductance. In this exemplary embodiment, the magnetic actuator 50 connected to electronic airbag ignition circuit 60 is configured as a LEA magnetic actuator.

Furthermore, in this exemplary embodiment, second control circuit 17 is configured to close second switching element 2 in a first triggering mode for a first predetermined duration and in a second triggering mode for a second predetermined duration that differs from the first duration. In other words, the electronic airbag ignition circuit 60 of the present invention makes it possible to activate the second switching element 2, that is, the low-side switching element, in two different triggering or firing modes. The first and the second triggering mode differ essentially in the respective duration of the activation of second switching element 2, that is, in other words, in the duration in which second switching element 2 is closed in each triggering mode. In this exemplary embodiment, second switching element 2 is operated in the first triggering mode if the flow of current through the contact-break path of second switching element 2 at the time of the airbag ignition corresponds to a short-circuit current flowing through electronic airbag ignition circuit 60 in the short-circuit case. In this exemplary embodiment, electronic airbag ignition circuit 60 furthermore includes an arrangement for measuring the flow of current through electronic airbag ignition circuit 60 or an arrangement for detecting a short-circuit current (not shown), which in this exemplary embodiment purely by way of example measures the voltage drop between second output 16 and second input 12 and infers from this, by taking into account additional measured values, the current flowing through electronic airbag ignition circuit 60. It is also possible, however, to implement electronic airbag ignition circuits 60 in accordance with the present invention, in which the measurement of the presence of a short circuit occurs in a different manner and for example without an arrangement for measuring the flow of current through electronic airbag ignition circuit 60 or without an arrangement for detecting a short-circuit current. Stated differently, electronic airbag ignition circuit 60 of the present invention is configured to supply current to a magnetic actuator 50 connected to electronic airbag ignition circuit 60 in a first triggering state for a predetermined duration if the arrangement for measuring the flow of current through electronic airbag ignition circuit 60 measures a short-circuit current at the time of the ignition of the airbag.

The electronic airbag ignition circuit 60 of the present invention or the second control circuit 17 in this exemplary embodiment are further configured, purely by way of example, to operate second switching element 2 in the second triggering mode if the current flowing through the contract-break path of second switching element 2 at the time of the airbag ignition is smaller than a short-circuit current flowing through electronic airbag ignition circuit 60 in the short-circuit case. In other words, electronic airbag ignition circuit 60 is configured to supply current for a predetermined second duration to a magnetic actuator 50 connected to airbag ignition circuit 60 if no short-circuit current flows in electronic airbag ignition circuit 60 at a time of the airbag ignition.

In this specific embodiment, the first predetermined duration is purely by way of example shorter than the second predetermined duration. The selection of the preset or predetermined first and second duration occurs with a view to the magnitude of the inductance connected to electronic airbag ignition circuit 60. In this exemplary embodiment, the predetermined first duration purely by way of example corresponds to a value of 1.8 ms, while the predetermined second duration purely by way of example corresponds to a value of 3 ms. It is also possible, however, to design electronic airbag ignition circuits 60 of the present invention, in which the first and the second predetermined duration is selected to be for example significantly longer or shorter than described above.

Through the different types of activation in the first and second triggering mode, the duration, during which an ignition current flows through the inductance of magnetic actuator 50, is adapted to the respective load case of electronic airbag ignition circuit 60 or of the first and second switching element 1, 2, which is essentially determined by the flow or absence of flow of a short-circuit current.

Figure 2:
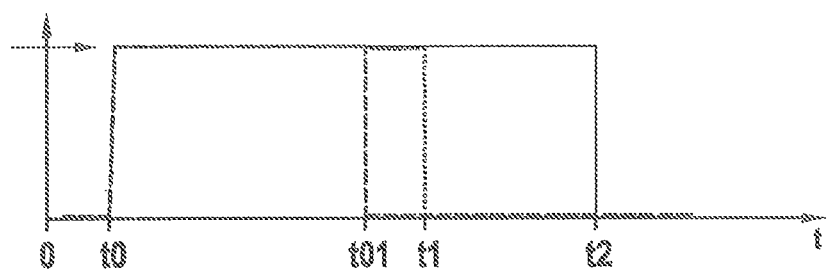
FIG. 2 a representation of the operation of the second switching element of the electronic airbag ignition circuit in the first as well as in the second triggering mode.

FIG. 2 shows a representation of the operation of second switching element 2 of electronic airbag ignition circuit 60 in the first as well as in the second triggering mode.

The electronic airbag ignition circuit 60, the operation of which is shown in FIG. 2, is purely by way of example the airbag ignition circuit shown in FIG. 1. Expressed more precisely, FIG. 2 shows how switching element 2 or the low side of electronic airbag ignition circuit 60 is operated during the first and during the second triggering mode. In FIG. 2, time t is plotted on the abscissa, while the operating state of second switching element 2, which in the representation of FIG. 2 for the sake of simplicity is only able to assume the states "open" and "closed", is plotted on the ordinate. If a line runs on the abscissa of FIG. 2, then this indicates an operating state in which second switching element 2 is open. If a line runs at the level of the arrow drawn in FIG. 2, then this indicates an operating state in which second switching element 2 is closed. The curve of the dashed line indicates in what time period, that is, over which first duration, second switching element 2 is closed in the first triggering mode. The curve of the solid line in FIG. 2 furthermore indicates in what time period, that is, over which second duration, second switching element 2 is closed in the second triggering mode. In contrast to the previously mentioned lines, the curve of the dotted line in FIG. 2 shows the time period or the duration, in which second switching element 2 in the related art is closed or is activated independently of the existence of a short circuit for triggering a firing pellet.

Up to time t0, which characterizes the switching-on of second switching element 2 or the low side and thus at the same time the initialization of an airbag triggering, second switching element 2 is open so that no ignition current flows through electronic airbag ignition circuit 60. Second switching element 2 is closed at time t0. Second switching element 2 is closed for the shortest time in the first triggering mode, that is, for the predetermined first duration, which in this exemplary embodiment is 1.8 ms purely by way of example. Already at t01, that is, in this exemplary embodiment at 1.8 ms, purely by way of example, second switching element 2 is opened again. The brevity of the predetermined first duration is explained by the high short-circuit current flowing in the short-circuit case, which represents a great load for electronic airbag ignition circuit 60 and in particular for first and second switching element 1, 2. After time t1, second switching element 2 is opened in the related art, irrespective of the possible flow of a short-circuit current. Thus, in the related art, there is no distinction of cases when activating second switching element 2 or the low side. In the second triggering mode, second switching element 2 is opened again after a predetermined second duration, which ends in FIG. 2 at t2 and is in this exemplary embodiment markedly longer than the first predetermined duration. In this exemplary embodiment, the predetermined second duration is purely by way of example 3 ms. The predetermined second duration is longer than for example the predetermined first duration because the inductance connected to electronic airbag ignition circuit 60 initially counteracts the build-up of an ignition current.

Figure 3:
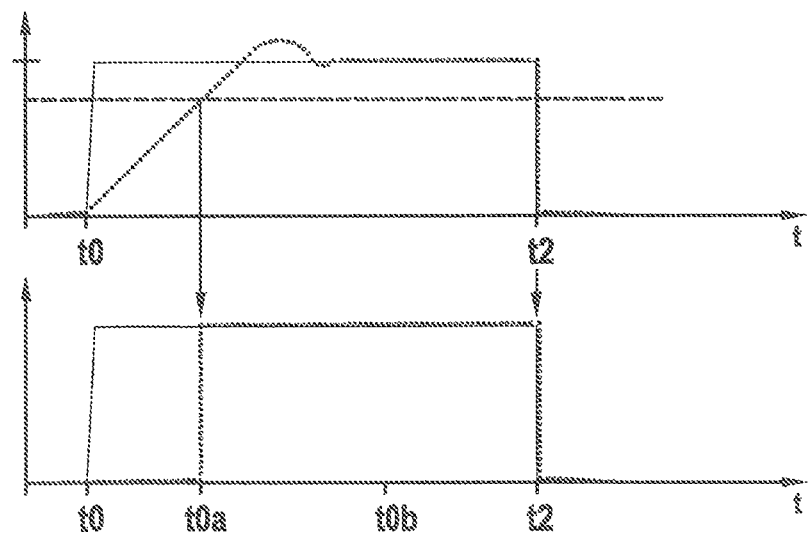
FIG. 3 a representation of the current characteristic on the magnetic actuator during the second triggering mode.

FIG. 3 shows a representation of the current characteristic on magnetic actuator 50 during the second triggering mode. Expressed more precisely, FIG. 3 shows the characteristic of the ignition current through the inductance of a magnetic actuator 50 connected to the ignition circuit 60 represented in FIG. 1, which is supplied with current in accordance with the second triggering mode represented in FIG. 2, that is, over the predetermined second duration. While the solid line represents the second triggering mode both in the upper as well as in the lower diagram of FIG. 3, the dashed line in the upper diagram of FIG. 3 shows a predetermined threshold, selected purely by way of example, for the current flowing through the inductance of magnetic actuator 50, the flow of an ignition current through ignition current detection unit 4 being detected when the ignition current exceeds the threshold. The dotted line in the upper diagram of FIG. 3 furthermore shows the characteristic of the flow of current through airbag ignition circuit 60 that is influenced by the inductance of magnetic actuator 50. It initially rises in a linear manner because the inductance counteracts the build-up of an ignition current. For this reason, the detection of the ignition current by ignition current detection unit 4 does not coincide with the initialization of the airbag ignition at t0, but rather shifts to time t0*a*, at which the flow of current through the inductance exceeds the predetermined threshold for the current flowing through the inductance of magnetic actuator 50. The time at which the threshold is exceeded is represented in the lower diagram of FIG. 3 likewise by a dotted line. Furthermore, at time t0*b*, a plausibility check of the airbag triggering is performed. Since the ignition current required for triggering the airbag must flow through airbag ignition circuit 60 for a predetermined duration, and since the ignition current, as already described, does not build up immediately because of the inductance, the second predetermined duration is extended compared to the duration of the supply of current to a firing pellet by an airbag ignition circuit of the related art. The absolute value by which the predetermined duration is extended compared to the triggering duration of the related art depends on the inductance of magnetic actuator 50 and results from the difference in time between t0*a* and t0.

What is claimed is:

1. An electronic airbag ignition circuit, comprising:
 a first input and a second input for an electrically conductive connection to the poles of an energy store;
 a first output and a second output for the electrically conductive connection to a first terminal and a second terminal of a magnetic actuator;
 a first switching element whose contact-break path is connected in an electrically conductive manner to the first input and the first output;
 a second switching element, whose contact-break path is connected in an electrically conductive manner to the second input and the second output; and
 a second control circuit connected in an electrically conductive manner to a control terminal of the second switching element;
 wherein the second control circuit is configured to close the second switching element in a first triggering mode for a first predetermined duration and in a second triggering mode for a second predetermined duration that differs from the first duration, and
 wherein the magnetic actuator includes a low energy actuator (LEA) magnetic actuator.

2. The electronic airbag ignition circuit of claim 1, wherein the electronic airbag ignition circuit includes an integrated circuit.

3. The electronic airbag ignition circuit of claim 1, wherein the pole of the energy store that is connected to the second input has a ground potential.

4. An electronic airbag ignition circuit, comprising:
 a first input and a second input for an electrically conductive connection to the poles of an energy store;
 a first output and a second output for the electrically conductive connection to a first terminal and a second terminal of a magnetic actuator;
 a first switching element whose contact-break path is connected in an electrically conductive manner to the first input and the first output;
 a second switching element, whose contact-break path is connected in an electrically conductive manner to the second input and the second output; and
 a second control circuit connected in an electrically conductive manner to a control terminal of the second switching element;
 wherein the second control circuit is configured to close the second switching element in a first triggering mode for a first predetermined duration and in a second triggering mode for a second predetermined duration that differs from the first duration, and
 wherein the second switching element is operated in the first triggering mode if the flow of current through the contact-break path of the second switching element at the time of the airbag ignition corresponds to a short-circuit current flowing through the electronic airbag ignition circuit in the short-circuit case.

5. An electronic airbag ignition circuit, comprising:
 a first input and a second input for an electrically conductive connection to the poles of an energy store;
 a first output and a second output for the electrically conductive connection to a first terminal and a second terminal of a magnetic actuator;
 a first switching element whose contact-break path is connected in an electrically conductive manner to the first input and the first output;
 a second switching element, whose contact-break path is connected in an electrically conductive manner to the second input and the second output; and
 a second control circuit connected in an electrically conductive manner to a control terminal of the second switching element;
 wherein the second control circuit is configured to close the second switching element in a first triggering mode for a first predetermined duration and in a second triggering mode for a second predetermined duration that differs from the first duration, and
 wherein the second switching element is operated in the second triggering mode if the current flowing through the contact-break path of the second switching element at the time of the airbag ignition differs from a short-circuit current flowing through the electronic airbag ignition circuit in the short-circuit case.

6. An electronic airbag ignition circuit, comprising:
a first input and a second input for an electrically conductive connection to the poles of an energy store;
a first output and a second output for the electrically conductive connection to a first terminal and a second terminal of a magnetic actuator;
a first switching element whose contact-break path is connected in an electrically conductive manner to the first input and the first output;
a second switching element, whose contact-break path is connected in an electrically conductive manner to the second input and the second output; and
a second control circuit connected in an electrically conductive manner to a control terminal of the second switching element;
wherein the second control circuit is configured to close the second switching element in a first triggering mode for a first predetermined duration and in a second triggering mode for a second predetermined duration that differs from the first duration, and
wherein the first predetermined duration is shorter than the second predetermined duration.

7. The electronic airbag ignition circuit of claim 6, wherein the total output implemented during the second triggering mode on the first switching element following the expiration of the second duration corresponds to the maximum admissible output to be implemented on the first switching element.

8. An electronic airbag ignition circuit, comprising:
a first input and a second input for an electrically conductive connection to the poles of an energy store;
a first output and a second output for the electrically conductive connection to a first terminal and a second terminal of a magnetic actuator;
a first switching element whose contact-break path is connected in an electrically conductive manner to the first input and the first output;
a second switching element, whose contact-break path is connected in an electrically conductive manner to the second input and the second output; and
a second control circuit connected in an electrically conductive manner to a control terminal of the second switching element;
wherein the second control circuit is configured to close the second switching element in a first triggering mode for a first predetermined duration and in a second triggering mode for a second predetermined duration that differs from the first duration, and
wherein the electronic airbag ignition circuit includes a first control circuit connected in an electrically conductive manner to a control terminal of the first switching element, which has an ignition current detection unit and/or a unit for controlling an ignition current.

9. An electronic airbag ignition circuit, comprising:
a first input and a second input for an electrically conductive connection to the poles of an energy store;
a first output and a second output for the electrically conductive connection to a first terminal and a second terminal of a magnetic actuator;
a first switching element whose contact-break path is connected in an electrically conductive manner to the first input and the first output;
a second switching element, whose contact-break path is connected in an electrically conductive manner to the second input and the second output; and
a second control circuit connected in an electrically conductive manner to a control terminal of the second switching element;
wherein the second control circuit is configured to close the second switching element in a first triggering mode for a first predetermined duration and in a second triggering mode for a second predetermined duration that differs from the first duration,
wherein the electronic airbag ignition circuit includes an integrated circuit, and
wherein the integrated circuit is implemented as an ASIC.

10. A motor vehicle, comprising:
an electronic airbag ignition circuit, including:
a first input and a second input for an electrically conductive connection to the poles of an energy store;
a first output and a second output for the electrically conductive connection to a first terminal and a second terminal of a magnetic actuator;
a first switching element whose contact-break path is connected in an electrically conductive manner to the first input and the first output;
a second switching element, whose contact-break path is connected in an electrically conductive manner to the second input and the second output; and
a second control circuit connected in an electrically conductive manner to a control terminal of the second switching element;
wherein the second control circuit is configured to close the second switching element in a first triggering mode for a first predetermined duration and in a second triggering mode for a second predetermined duration that differs from the first duration, and
wherein the magnetic actuator includes a low energy actuator (LEA) magnetic actuator.

* * * * *